(12) United States Patent
Suzuki et al.

(10) Patent No.: US 11,134,479 B2
(45) Date of Patent: Sep. 28, 2021

(54) TERMINAL DEVICE, INTEGRATED CIRCUIT, AND COMMUNICATION METHOD

(71) Applicant: SHARP KABUSHIKI KAISHA, Osaka (JP)

(72) Inventors: Shoichi Suzuki, Sakai (JP); Tatsushi Aiba, Sakai (JP); Kazunari Yokomakura, Sakai (JP); Hiroki Takahashi, Sakai (JP); Wataru Ouchi, Sakai (JP); Naoki Kusashima, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/576,446

(22) PCT Filed: May 23, 2016

(86) PCT No.: PCT/JP2016/065230
§ 371 (c)(1),
(2) Date: Nov. 22, 2017

(87) PCT Pub. No.: WO2016/190287
PCT Pub. Date: Dec. 1, 2016

(65) Prior Publication Data
US 2018/0160421 A1    Jun. 7, 2018

(30) Foreign Application Priority Data

May 22, 2015 (JP) .............................. JP2015-104068

(51) Int. Cl.
*H04W 72/04* (2009.01)
*H04W 24/10* (2009.01)
(Continued)

(52) U.S. Cl.
CPC ....... *H04W 72/0413* (2013.01); *H04L 1/0687* (2013.01); *H04L 5/001* (2013.01);
(Continued)

(58) Field of Classification Search
CPC ...... H04L 1/0687; H04L 5/001; H04W 24/10; H04W 72/04; H04W 72/0413; H04W 88/02; H04W 88/08
See application file for complete search history.

(56) References Cited

U.S. PATENT DOCUMENTS

2013/0250903 A1* 9/2013 Ahn .................. H04W 72/0413
                                                     370/329
2014/0233469 A1* 8/2014 Seo ......................... H04L 5/001
                                                     370/329
(Continued)

FOREIGN PATENT DOCUMENTS

EP           2704342 A2   3/2014
KR   10-2013-0124755 A   11/2013
(Continued)

OTHER PUBLICATIONS

TSG-RAN WG2, Reply LS on RAN1 agreements on PUCCH on SCell for CA, R2-151711, 3GPP TSG-RAN WG2 #89bis, Bratislava, Slovakia, Apr. 20-24, 2015, Retrieved from the Internet: <URL:http://www.3gpp.org/ftp/tsg_ran/WG2_RL2/TSGR2_89bis/Docs/R2-151711.zip>.

(Continued)

*Primary Examiner* — Jeffrey M Rutkowski
*Assistant Examiner* — Jasper Kwoh
(74) *Attorney, Agent, or Firm* — ScienBiziP, P.C.

(57) ABSTRACT

When a terminal device receives a MAC CE indicating activation of a second cell in subframe n and an action of monitoring a PDCCH for a first cell is not applied in subframe n+8, an action related to CSI reporting for the (Continued)

second cell on a PUCCH is applied in a subframe that is no earlier than subframe n+8 and in which an action of monitoring the PDCCH for the first cell is applied. When the terminal device receives the MAC CE indicating activation of the second cell in subframe n, the action related to the CSI reporting for the second cell on the PUCCH is applied in subframe n+8, irrespective of whether the action of monitoring the PDCCH for the first cell is applied in subframe n+8.

4 Claims, 5 Drawing Sheets

(51) Int. Cl.
*H04L 1/06* (2006.01)
*H04L 5/00* (2006.01)
*H04W 88/02* (2009.01)
*H04W 88/08* (2009.01)

(52) U.S. Cl.
CPC ........... *H04W 24/10* (2013.01); *H04W 72/04* (2013.01); *H04W 88/02* (2013.01); *H04W 88/08* (2013.01)

(56) References Cited

U.S. PATENT DOCUMENTS

| | | | |
|---|---|---|---|
| 2015/0103771 A1 | 4/2015 | Kim et al. | |
| 2015/0304925 A1* | 10/2015 | Hwang | H04L 5/00 370/331 |
| 2016/0157223 A1 | 6/2016 | Nogami et al. | |
| 2016/0278083 A1* | 9/2016 | Dinan | H04W 52/0219 |
| 2017/0117956 A1* | 4/2017 | Lee | H04B 7/2615 |
| 2018/0035323 A1* | 2/2018 | Li | H04W 24/10 |
| 2018/0049186 A1* | 2/2018 | Hong | H04L 5/0032 |
| 2018/0175975 A1* | 6/2018 | Um | H04L 1/1816 |

FOREIGN PATENT DOCUMENTS

| | | |
|---|---|---|
| WO | 2014/208560 A1 | 12/2014 |
| WO | 2016/144078 A1 | 9/2016 |

OTHER PUBLICATIONS

Samsung, Specification impacts by Activation/Deactivation of PUCCH Scell, R2-151630, 3GPP TSG-RAN WG2 #89bis, Apr. 20-24, 2015, Bratislava, Slovakia, Retrieved from the Internet: <URL: http://www.3gpp.org/ftp/tsg_ran/WG2_RL2/TSGR2_89bis/Docs/R2-151630.zip>.
Huawei, Hisilicon, Remaining issues for PUCCH on Scell, R2-152259, 3GPP TSGRAN WG2 Meeting #90, Fukuoka, Japan, May 25-29, 2015, Retrieved from the Internet: <URL: http ://www.3gpp.org/ftp/tsg_ran/WG2_RL2/TSGR2_90/Docs/R2-152259.zip>.
NTT Docomo et al: "Support of PUCCH on SCell for CA—RAN2 aspects", R2-143073 3GPP TSG-RAN WG2 #87, Aug. 18-22, 2014 Dresden, Germany, Retrieved from the Internet: URL: http://www.3gpp.org/ftp/Meetings_3GPP_SYNC/RAN2/Docs/.
ZTE: "Discussion on the impact for the support of PUCCH on SCell", R2-150151, 3GPP TSG-RAN WG2 meeting #89, Athens, Greece, Feb. 9-13, 2015 Retrieved from the Internet: URL: http://www.3gpp.org/ftp/Meetings_3GPP_SYNC/RAN2/Docs/.
Huawei et al: "Introduce PUCCH on SCell for CA beyond 5 carriers", R2-150372, 3GPP TSG-RAN WG2 meeting #89, Athens, Greece, Feb. 9-13, 2015 Retrieved from the Internet: URL: http://www.3gpp.org/ftp/Meetings_3GPP_SYNC/RAN2/Docs/.
"New WI proposal: LTE Carrier Aggregation Enhancement Beyond 5 Carriers", RP-142286, Nokia Corporation, NTT DoCoMo Inc., Nokia Networks, 3GPP TSG RANMeeting #66, Hawaii, United States of America, Dec. 8-11, 2014.
"Evolved Universal Terrestrial Radio Access (E-UTRA); Physical layer procedures"; 3GPP TS 36.213 v12.4.0 (Dec. 2014); 3rd Generation Partnership Project; France.
"Evolved Universal Terrestrial Radio Access (E-UTRA); Medium Access Control (MAC) protocol specification"; 3GPP TS 36.321 v12.4.0 (Dec. 2014); 3rd Generation Partnership Project; France.

* cited by examiner

TERMINAL DEVICE, INTEGRATED CIRCUIT, AND COMMUNICATION METHOD

TECHNICAL FIELD

The present invention relates to a terminal device, an integrated circuit, and a communication method.

This application claims priority based on JP 2015-104068 filed on May 22, 2015, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)", or "Evolved Universal Terrestrial Radio Access (EUTRA)") have been studied. In LTE, a base station device is also referred to as an evolved NodeB (eNodeB), and a terminal device is also referred to as User Equipment (UE). LTE is a cellular communication system in which an area is divided into multiple cells to form a cellular pattern, each of the cells being served by a base station device. A single base station device may manage multiple cells.

LTE supports Time Division Duplex (TDD). LTE that employs a TDD scheme is also referred to as TD-LTE or LTE TDD. In TDD, uplink signals and downlink signals are time-division multiplexed. Moreover, LTE supports Frequency Division Duplex (FDD).

In 3GPP, carrier aggregation has been specified which allows a terminal device to perform simultaneous transmission and/or reception in up to five serving cells (component carriers).

In 3GPP, a configuration in which a terminal device performs simultaneous transmission and/or reception in more than five serving cells (component carriers), has been considered (NPL 1). Furthermore, a configuration in which a terminal device transmits a physical uplink control channel in a secondary cell, which is a serving cell other than a primary cell, has been considered (NPL 1).

CITATION LIST

Non-Patent Document

[NON-PATENT DOCUMENT 1] NPL 1: "New WI proposal: LTE Carrier Aggregation Enhancement Beyond 5 Carriers", RP-142286, Nokia Corporation, NTT DoCoMo Inc., Nokia Networks, 3GPP TSG RAN Meeting #66, Hawaii, United States of America, 8-11 Dec. 2014.

[NON-PATENT DOCUMENT 2] NPL 2: "3GPP TS 36.321 v12.4.0 Evolved Universal Terrestrial Radio Access (E-UTRA); Medium Access Control (MAC) protocol specification", 5 Nov. 2015.

[NON-PATENT DOCUMENT 3] NPL 3: "3GPP TS 36.213 v12.4.0 Evolved Universal Terrestrial Radio Access (E-UTRA); Physical layer procedures", 7 Nov. 2015.

DISCLOSURE OF THE INVENTION

Problems to be Solved by the Invention

However, no concrete method has been sufficiently considered for transmission of a physical uplink control channel in a secondary cell, which is a serving cell other than a primary cell.

Some aspects of the present invention have been made in light of the foregoing, and an object of the present invention is to provide a terminal device capable of efficiently communicating with a base station device through multiple cells (component carriers), an integrated circuit mounted on the terminal device, a communication method used by the terminal device, a base station device communicating with the terminal device, an integrated circuit mounted on the base station device, and a communication method used by the base station device.

Means for Solving the Problems (1) In order to accomplish the above-described object, aspects of the present invention are contrived to provide the following means. Specifically, a first aspect of the present invention is a terminal device including: a measurement unit configured to derive channel state information; a transmission unit configured to transmit an HARQ-ACK relating to a first secondary cell, a second secondary cell, and a third secondary cell on a physical uplink control channel in the first secondary cell, transmit channel state information reporting for the second secondary cell, on the physical uplink control channel in the first secondary cell, and transmit the channel state information reporting for the second secondary cell, on a physical uplink shared channel in the first secondary cell, the second secondary cell, or the third secondary cell; and a MAC layer processing unit configured to, when a MAC control element indicating activation of the first secondary cell, the second secondary cell, and/or the third secondary cell is received, activate the first secondary cell, the second secondary cell, and/or the third secondary cell. Activating the first secondary cell, the second secondary cell, or the third secondary cell includes applying multiple actions including an action related to channel state information reporting for the first secondary cell, the second secondary cell, or the third secondary cell and an action related to monitoring the physical downlink control channel for the first secondary cell, the second secondary cell, or the third secondary cell. When the MAC control element indicating activation of the second secondary cell is received in subframe n and the action of monitoring the physical downlink control channel for the first secondary cell is applied in subframe n+8, the action related to the channel state information reporting for the second secondary cell on the physical uplink control channel is applied in the subframe n+8. When the MAC control element indicating activation of the second secondary cell is received in the subframe n and the action of monitoring the physical downlink control channel for the first secondary cell is not applied in the subframe n+8, the action related to the channel state information reporting for the second secondary cell on the physical uplink control channel is applied in a subframe that is no earlier than the subframe n+8 and in which the action of monitoring the physical downlink control channel for the first secondary cell is applied. When the MAC control element indicating activation of the second secondary cell is received in the subframe n, the action related to the channel state information reporting for the second secondary cell on the physical uplink shared channel is applied in the subframe n+8, irrespective of whether the action of monitoring the physical downlink control channel for the first secondary cell is applied in the subframe n+8.

(2) Moreover, a second aspect of the present invention is a terminal device including: a measurement unit configured to derive channel state information; a transmission unit configured to transmit an HARQ-ACK relating to a first secondary cell, a second secondary cell, and a third secondary cell on a physical uplink control channel in the first secondary cell, transmit channel state information reporting for the second secondary cell, on the physical uplink control channel in the first secondary cell, and transmit the channel state information reporting for the second secondary cell, on a physical uplink shared channel in the first secondary cell, the second secondary cell, or the third secondary cell; and a MAC layer processing unit configured to, when a MAC control element indicating activation of the first secondary cell, the second secondary cell, and/or the third secondary cell is received, activate the first secondary cell, the second secondary cell, and/or the third secondary cell. Activating the first secondary cell, the second secondary cell, or the third secondary cell includes applying multiple actions including an action related to channel state information reporting for the first secondary cell, the second secondary cell, or the third secondary cell and an action related to monitoring the physical downlink control channel for the first secondary cell, the second secondary cell, or the third secondary cell. When the MAC control element indicating activation of the second secondary cell is received in subframe n and the action of monitoring the physical downlink control channel for the first secondary cell is applied in subframe n+8, the action related to the channel state information reporting for the second secondary cell in the first secondary cell is applied in the subframe n+8. When the MAC control element indicating activation of the second secondary cell is received in the subframe n and the action of monitoring the physical downlink control channel for the first secondary cell is not applied in the subframe n+8, the action related to the channel state information reporting for the second secondary cell in the first secondary cell is applied in a subframe that is no earlier than the subframe n+8 and in which the action of monitoring the physical downlink control channel for the first secondary cell is applied. When the MAC control element indicating activation of the second secondary cell is received in the subframe n, the action related to the channel state information reporting for the second secondary cell in the third secondary cell is applied in the subframe n+8, irrespective of whether the action of monitoring the physical downlink control channel for the first secondary cell is applied in the subframe n+8.

(3) Moreover, a third aspect of the present invention is an integrated circuit mounted on a terminal device. The integrated circuit causes the terminal device to exert a series of functions including: a function of deriving channel state information; a function of transmitting an HARQ-ACK relating to a first secondary cell, a second secondary cell, and a third secondary cell on a physical uplink control channel in the first secondary cell; a function of transmitting channel state information reporting for the second secondary cell, on the physical uplink control channel in the first secondary cell; a function of transmitting the channel state information reporting for the second secondary cell, on a physical uplink shared channel in the first secondary cell, the second secondary cell, or the third secondary cell; and a function of, when a MAC control element indicating activation of the first secondary cell, the second secondary cell, and/or the third secondary cell is received, activating the first secondary cell, the second secondary cell, and/or the third secondary cell. Activating the first secondary cell, the second secondary cell, or the third secondary cell includes applying multiple actions including an action related to channel state information reporting for the first secondary cell, the second secondary cell, or the third secondary cell and an action related to monitoring the physical downlink control channel for the first secondary cell, the second secondary cell, or the third secondary cell. When the MAC control element indicating activation of the second secondary cell is received in subframe n and the action of monitoring the physical downlink control channel for the first secondary cell is applied in subframe n+8, the action related to the channel state information reporting for the second secondary cell on the physical uplink control channel is applied in the subframe n+8. When the MAC control element indicating activation of the second secondary cell is received in the subframe n and the action of monitoring the physical downlink control channel for the first secondary cell is not applied in the subframe n+8, the action related to the channel state information reporting for the second secondary cell on the physical uplink control channel is applied in a subframe that is no earlier than the subframe n+8 and in which the action of monitoring the physical downlink control channel for the first secondary cell is applied. When the MAC control element indicating activation of the second secondary cell is received in the subframe n, the action related to the channel state information reporting for the second secondary cell on the physical uplink shared channel is applied in the subframe n+8, irrespective of whether the action of monitoring the physical downlink control channel for the first secondary cell is applied in the subframe n+8.

(4) Moreover, a fourth aspect of the present invention is an integrated circuit mounted on a terminal device. The integrated circuit causes the terminal device to exert a series of functions including: a function of deriving channel state information; a function of transmitting an HARQ-ACK relating to a first secondary cell, a second secondary cell, and a third secondary cell on a physical uplink control channel in the first secondary cell; a function of transmitting channel state information reporting for the second secondary cell, on the physical uplink control channel in the first secondary cell; a function of transmitting the channel state information reporting for the second secondary cell, on a physical uplink shared channel in the first secondary cell, the second secondary cell, or the third secondary cell; and a function of, when a MAC control element indicating activation of the first secondary cell, the second secondary cell, and/or the third secondary cell is received, activating the first secondary cell, the second secondary cell, and/or the third secondary cell. Activating the first secondary cell, the second secondary cell, or the third secondary cell includes applying multiple actions including an action related to channel state information reporting for the first secondary cell, the second secondary cell, or the third secondary cell and an action related to monitoring the physical downlink control channel for the first secondary cell, the second secondary cell, or the third secondary cell. When the MAC control element indicating activation of the second secondary cell is received in subframe n and the action of monitoring the physical downlink control channel for the first secondary cell is applied in subframe n+8, the action related to the channel state information reporting for the second secondary cell in the first secondary cell is applied in the subframe n+8. When the MAC control element indicating activation of the second secondary cell is received in the subframe n and the action of monitoring the physical downlink control channel for the first secondary cell is not applied in the subframe n+8, the action related to the channel state information reporting for the second secondary cell in the first secondary cell is applied in a subframe that is no earlier than the subframe n+8 and in which the action of monitoring the physical downlink control channel for the first secondary cell is applied. When the MAC control element indicating activation of the second secondary cell is received in the subframe n, the action related to the channel state information reporting for the second secondary cell in the third secondary cell is applied in the subframe n+8, irrespective of whether the action of monitoring the physical downlink control channel for the first secondary cell is applied in the subframe n+8.

(5) Moreover, a fifth aspect of the present invention is a communication method used by a terminal device. The communication method includes: deriving channel state information; transmitting an HARQ-ACK relating to a first secondary cell, a second secondary cell, and a third secondary cell on a physical uplink control channel in the first secondary cell; transmitting channel state information reporting for the second secondary cell, on the physical uplink control channel in the first secondary cell; transmitting the channel state information reporting for the second secondary cell, on a physical uplink shared channel in the first secondary cell, the second secondary cell, or the third secondary cell; and when a MAC control element indicating activation of the first secondary cell, the second secondary cell, and/or the third secondary cell is received, activating the first secondary cell, the second secondary cell, and/or the third secondary cell. Activating the first secondary cell, the second secondary cell, or the third secondary cell includes applying multiple actions including an action related to channel state information reporting for the first secondary cell, the second secondary cell, or the third secondary cell and an action related to monitoring the physical downlink control channel for the first secondary cell, the second secondary cell, or the third secondary cell. When the MAC control element indicating activation of the second secondary cell is received in subframe n and the action of monitoring the physical downlink control channel for the first secondary cell is applied in subframe n+8, the action related to the channel state information reporting for the second secondary cell on the physical uplink control channel is applied in the subframe n+8. When the MAC control element indicating activation of the second secondary cell is received in the subframe n and the action of monitoring the physical downlink control channel for the first secondary cell is not applied in the subframe n+8, the action related to the channel state information reporting for the second secondary cell on the physical uplink control channel is applied in a subframe that is no earlier than the subframe n+8 and in which the action of monitoring the physical downlink control channel for the first secondary cell is applied. When the MAC control element indicating activation of the second secondary cell is received in the subframe n, the action related to the channel state information reporting for the second secondary cell on the physical uplink shared channel is applied in the subframe n+8, irrespective of whether the action of monitoring the physical downlink control channel for the first secondary cell is applied in the subframe n+8.

(6) Moreover, a sixth aspect of the present invention is a communication method used by a terminal device. The communication method causes the terminal device to exert a series of functions including: deriving channel state information; transmitting an HARQ-ACK relating to a first secondary cell, a second secondary cell, and a third secondary cell on a physical uplink control channel in the first secondary cell; transmitting channel state information reporting for the second secondary cell, on the physical uplink control channel in the first secondary cell; transmitting the channel state information reporting for the second secondary cell, on a physical uplink shared channel in the first secondary cell, the second secondary cell, or the third secondary cell; and when a MAC control element indicating activation of the first secondary cell, the second secondary cell, and/or the third secondary cell is received, activating the first secondary cell, the second secondary cell, and/or the third secondary cell. Activating the first secondary cell, the second secondary cell, or the third secondary cell includes applying multiple actions including an action related to channel state information reporting for the first secondary cell, the second secondary cell, or the third secondary cell and an action related to monitoring the physical downlink control channel for the first secondary cell, the second secondary cell, or the third secondary cell. When the MAC control element indicating activation of the second secondary cell is received in subframe n and the action of monitoring the physical downlink control channel for the first secondary cell is applied in subframe n+8, the action related to the channel state information reporting for the second secondary cell in the first secondary cell is applied in the subframe n+8. When the MAC control element indicating activation of the second secondary cell is received in the subframe n and the action of monitoring the physical downlink control channel for the first secondary cell is not applied in the subframe n+8, the action related to the channel state information reporting for the second secondary cell in the first secondary cell is applied in a subframe that is no earlier than the subframe n+8 and in which the action of monitoring the physical downlink control channel for the first secondary cell is applied. When the MAC control element indicating activation of the second secondary cell is received in the subframe n, the action related to the channel state information reporting for the second secondary cell in the third secondary cell is applied in the subframe n+8, irrespective of whether the action of monitoring the physical downlink control channel for the first secondary cell is applied in the subframe n+8.

Effects of the Invention

According to some aspects of the present invention, the terminal device can efficiently communicate with the base station device through multiple cells (component carriers).

MODE FOR CARRYING OUT THE INVENTION

Embodiments of the present invention will be described below.

Figure 1:
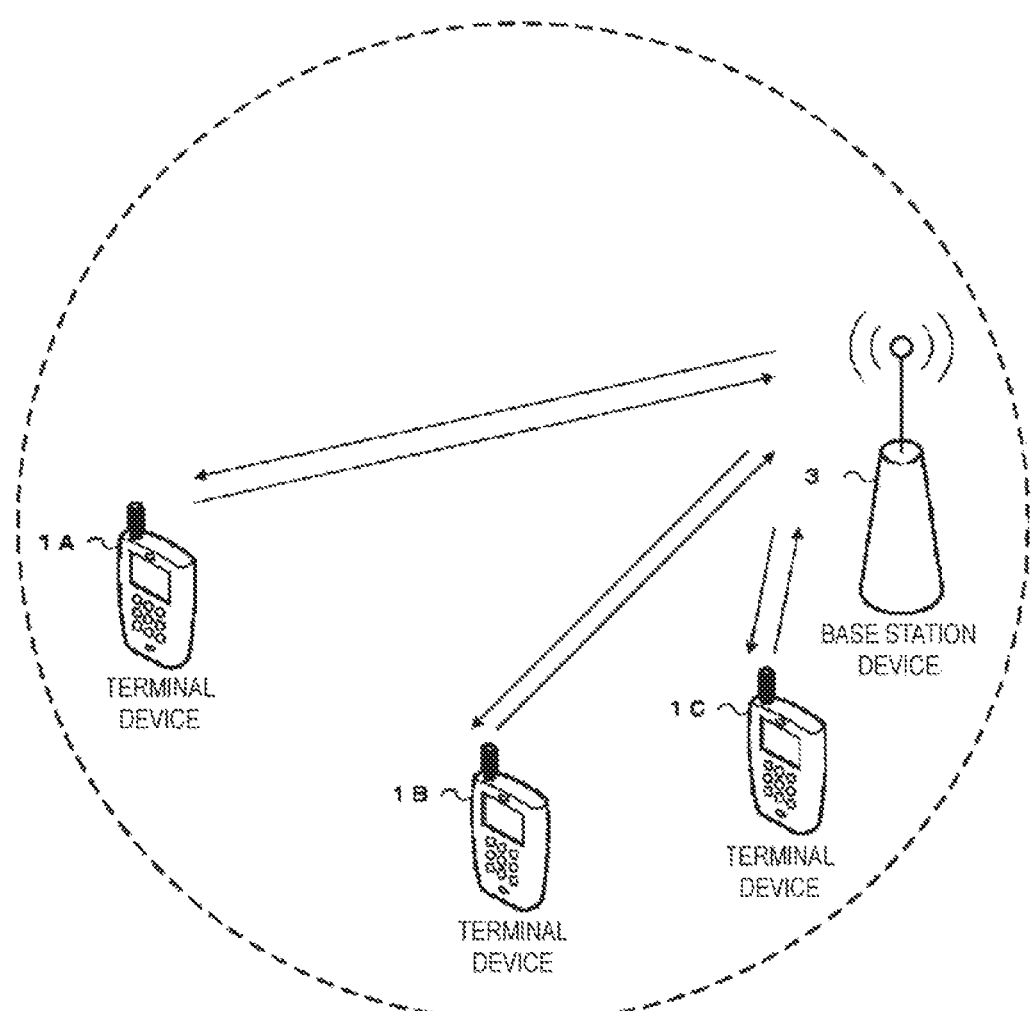
FIG. 1 is a conceptual diagram of a radio communication system according to the present embodiment.

FIG. 1 is a conceptual diagram of a radio communication system according to the present embodiment. In FIG. 1, the radio communication system includes terminal devices 1A to 1C and a base station device 3. The terminal devices 1A to 1C are each referred to as a terminal device 1 below.

Carrier aggregation will be described below.

In the present embodiment, multiple serving cells are configured for the terminal device 1. A technology in which the terminal device 1 communicates via the multiple cells is referred to as cell aggregation or carrier aggregation. The present invention may be applied to each of the multiple serving cells configured for the terminal device 1. Furthermore, the present invention may be applied to some of the multiple configured serving cells. Furthermore, the present invention may be applied to each of groups of the multiple configured serving cells. Furthermore, the present invention may be applied to some of the groups of the multiple configured serving cells. In carrier-aggregation, multiple configured serving cells may also be referred to as aggregated serving cells.

Time Division Duplex (TDD) and/or Frequency Division Duplex (FDD) is applied to a radio communication system according to the present embodiment. For cell aggregation, TDD may be applied to all of the multiple serving cells. Alternatively, for cell aggregation, serving cells to which TDD is applied and serving cells to which FDD is applied may be aggregated.

The multiple configured serving cells include one primary cell and one or multiple secondary cells. The primary cell is a serving cell in which an initial connection establishment procedure has been performed, a serving cell in which a connection re-establishment procedure has been started, or a cell indicated as a primary cell during a handover procedure. A secondary cell may be configured at the point of time when a Radio Resource Control (RRC) connection is established, or later.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier. An uplink component carrier and a downlink component carrier corresponding to a TDD serving cell are the same carrier.

The terminal device 1 can perform simultaneous transmission and/or reception on multiple physical channels in multiple serving cells (component carriers). A single physical channel is transmitted in a single serving cell (component carrier) of the multiple serving cells (component carriers).

In the present embodiment, a secondary cell used for transmission of a Physical Uplink Control Channel (PUCCH) is referred to as a special secondary cell or a PUCCH secondary cell. In the present embodiment, a secondary cell not used for the transmission of the PUCCH is referred to as a non-special secondary cell, a non-PUCCH secondary cell, a non-PUCCH serving cell, or a non-PUCCH cell. The primary cell and the special secondary cell are collectively referred to as a PUCCH serving cell or a PUCCH cell.

The PUCCH serving cell (the primary cell, the PUCCH secondary cell) includes the downlink component carrier and the uplink component carrier. A resource for PUCCH is configured in the PUCCH: serving cell (the primary cell, the PUCCH secondary cell).

The non-PUCCH serving cell (non-PUCCH secondary cell) may include only the downlink component carrier. The non-PUCCH serving cell (non-PUCCH secondary cell) may include the downlink component carrier and the uplink component carrier.

The terminal device 1 performs transmission on the PUCCH in the PUCCH serving cell. The terminal device 1 performs transmission on the PUCCH in the primary cell. The terminal device 1 performs transmission on the PUCCH in the special secondary cell. The terminal device 1 does not perform transmission on the PUCCH in the non-special secondary cell.

Note that the special secondary cell may be defined as a serving cell other than the primary cell or the secondary cell.

Physical channels and physical signals according to the present embodiment will be described.

In FIG. 1, uplink radio communication from the terminal device 1 to the base station device 3 uses the following uplink physical channels. The uplink physical channels are used to transmit information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The uplink control information includes: downlink Channel State Information (CSI); a Scheduling Request (SR) used to request an Uplink-Shared Channel (UL-SCH) (PUSCH) resource for initial transmission; and a Hybrid Automatic Repeat request ACKnowledgement (HARQ-ACK) for downlink data (a Transport block, a Medium Access Control Protocol Data. Unit (MAC PDU), a Downlink-Shared Channel (DL-SCH), or a Physical Downlink Shared Channel (PUSCH)). The HARQ-ACK indicates an acknowledgement (ACK) or a negative-acknowledgement (HACK). The HARQ-ACK is also referred to as ACK/NACK, HARQ feedback, HARQ acknowledge, HARQ information, or HARQ control information.

The scheduling request includes a positive scheduling request or a negative scheduling request. The positive scheduling request indicates that an UL-SCH resource for initial transmission is requested. The negative scheduling request indicates that an UL-SCH resource for initial transmission is not requested.

PUCCH format 1 is used to transmit a positive scheduling request. PUCCH format 1a is used to transmit a one-bit HARQ-ACK. PUCCH format 1b is used to transmit a two-bit HARQ-ACK. PUCCH format 1b with channel selection is used to transmit an HARQ-ACK of up to four bits when more than one serving cell is configured for the terminal device. PUCCH format 3 may be used to transmit an HARQ-ACK only. PUCCH format 3 may be used to transmit an HARQ-ACK and a scheduling request (a positive scheduling request or a negative scheduling request).

The PUSCH is used to transmit uplink data (Uplink-Shared Channel (UL-SCH)). Alternatively, the PUSCH may be used to transmit the HARQ-ACK and/or channel state information along with the uplink data. Alternatively, the PUSCH may be used to transmit only the channel state information or to transmit only the HARQ-ACK and the channel state information.

Here, the se station device 3 and the terminal device 1 communicate a signal in (transmit and receive a signal to and from) the higher layer. For example, the base station device 3 and the terminal device 1 may transmit and receive Radio Resource Control (RRC) signaling (also referred to as a RRC message, RRC information) in a RRC layer. Moreover, the base station device 3 and the terminal device 1 may transmit and receive a Medium Access Control (MAC)

Control Element (CE) in a MAC layer. Here, the RRC signaling and/or the MAC CE is also referred to as higher layer signaling.

The PUSCH is used to transmit the RRC signaling and the MAC CE. Here, the RRC signaling transmitted from the base station device 3 may be signaling shared by multiple terminal devices 1 in a cell. Alternatively, the RRC signaling transmitted from the base station device 3 may be signaling dedicated to a certain terminal device 1 (also referred to as dedicated signaling). In other words, user device-specific information is transmitted using the signaling dedicated to a certain terminal device 1.

The PRACH is used to transmit a random access preamble. The PRACH is used to indicate the initial connection establishment procedure, the handover procedure, the connection re-establishment procedure, synchronization (timing adjustment) for uplink transmission, and the request for the PUSCH (UL-SCH) resource.

In FIG. 1, the following uplink physical signal is used in the uplink radio communication. The uplink physical signal is not used to transmit information output from the higher layer, but is used by a physical layer.

Uplink Reference Signal (UL RS)

According to the present embodiment, the following two types of uplink reference signals are used.

Demodulation Reference Signal (DMRS)

Sounding Reference Signal (SRS)

The DMRS is associated with transmission of the PUSCH or the PUCCH. The DMRS is time-multiplexed with the PUSCH or the PUCCH. The base station device 3 uses the DMRS in order to perform channel compensation of the PUSCH or the PUCCH, Transmission of both the PUSCH and the DMRS is hereinafter referred to simply as transmission of the PUSCH. Transmission of both the PUCCH and the DMRS is hereinafter referred to simply as transmission of the PUCCH.

The SRS has no association with the transmission of the PUSCH or the PUCCH. The base station device 3 uses the SRS in order to measure an uplink channel state.

In FIG. 1, the following downlink physical channels are used for downlink radio communication from the base station device 3 to the terminal device 1. The downlink physical channels are used to transmit the information output from the higher layer.

Physical Broadcast Channel (PBCH)
Physical Control Format Indicator Channel (PCFICH)
Physical Hybrid Automatic repeat request Indicator Channel (PHICH)
Physical Downlink Control Channel (PUCCH)
Enhanced Physical Downlink Control Channel (EPDCCH)
Physical Downlink Shared Channel (PDSCH)
Physical Multicast Channel (PMCH)

The PBCH is used to broadcast a Master Information Block (MIB), or a Broadcast Channel (BCH), which is shared by the terminal devices 1.

The PCFICH is used to transmit information indicating a region (OFDM symbols) to be used for transmission of the PDCCH.

The PHICH is used to transmit an HARQ indicator (HARQ feedback or response information) indicating an ACKnowledgement (ACK) or a Negative ACKnowledgement (NACK) with respect to the uplink data (Uplink Shared Channel (UL-SCH)) received by the base station device 3.

The PDCCH and the EPDCCH are used to transmit Downlink Control Information (DCI). The downlink control information is also referred to as a DCI format. The downlink control information includes DCI format 3, DCI format 3A, a downlink grant, and an uplink grant. The downlink grant is also referred to as downlink assignment or downlink allocation.

The downlink grant is used for scheduling of a single PDSCH within a single cell. The downlink grant is used for scheduling of the PDSCH within the same subframe as the subframe in which the downlink grant is transmitted.

The uplink grant is used for scheduling of a single PUSCH within a single cell. The uplink grant is used for scheduling of a single PUSCH within the fourth or later subframe from the subframe in which the uplink grant is transmitted. The uplink grant includes a TPC command for the PUSCH.

The CRC parity bits attached to the downlink grant or the uplink grant are scrambled with a Cell-Radio Network Temporary Identifier (C-RNTI) or a Semi Persistent Scheduling Cell-Radio Network Temporary Identifier (SPS C-RNTI). The C-RNTI and the SPS C-RNTI are identifiers for identifying a terminal device within a cell.

The C-RNTI is used to control the PDSCH or the PUSCH in a single subframe. The SPS C-RNTI is used to periodically allocate a resource for the PDSCH or the PUSCH.

The PDSCH is used to transmit downlink data (Downlink Shared Channel (DL-SCH)).

The PMCH is used to transmit multicast data (Multicast Channel (MCH)).

In FIG. 1, the following downlink physical signals are used in the downlink radio communication. The downlink physical signals are not used to transmit the information output from the higher layer, but are used by the physical layer.

Synchronization signal (SS)
Downlink Reference Signal (DL RS)

The synchronization signal is used in order for the terminal device 1 to be synchronized in terms of frequency and time domains for downlink. In the TDD scheme, the synchronization signal is mapped to subframes 0, 1, 5, and 6 within a radio frame. In the FDD scheme, the synchronization signal is mapped to subframes 0 and 5 within the radio frame.

The downlink reference signal is used in order for the terminal device 1 to perform channel compensation of the downlink physical channel. The downlink reference signal is used in order for the terminal device 1 to calculate the downlink channel state information.

According to the present embodiment, the following five types of downlink reference signals are used.

Cell-specific Reference Signal (CRS)
UE-specific Reference Signal (URS) associated with the PDSCH
Demodulation Reference Signal (DMRS) associated with the EPDCCH
Non-Zero Power Chanel State Information-Reference signal (NZP CSI-RS)
Zero Power Chanel State Information-Reference Signal (ZP CSI-RS)
Multimedia Broadcast and Multicast Service over Single Frequency Network Reference signal (MBSFN RS)
Positioning Reference Signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in the Medium Access Control (MAC) layer is referred to as a transport channel. The unit of the transport channel used in the MAC layer is referred to as a Transport Block (TB) or a MAC Protocol Data Unit (PDU). Control of a Hybrid Automatic Repeat reQuest (HARQ) is performed for each transport block in the MAC layer. The transport block is a unit of data that the MAC layer delivers to the physical layer. In the physical layer, the transport block is mapped to a codeword, and coding processing is performed on a codeword-by-codeword basis.

In the present embodiment, a random access procedure may be performed in the primary cell and the secondary cells. Note that only a single random access procedure is performed at any point in the time domain. In other words, multiple random access procedures are not performed simultaneously.

In the primary cell, the PRACH may be transmitted. The terminal device 1 receives information on the random access procedure in the primary cell (RRC message), from the base station device 3. The information on the random access procedure in the primary cell includes information indicating the set of PRACH resources in the primary cell.

The PRACH may be transmitted in a secondary cell. The terminal device 1 receives information on the random access procedure in the secondary cell (RRC message), from the base station device 3. The information on the random access procedure in the secondary cell includes information indicating the set of PRACH resources in the secondary cell.

In the present embodiment, a group of multiple serving cells is referred to as a PUCCH cell group or a PUCCH group. A serving cell belongs to any one of the PUCCH cell groups.

One PUCCH cell group may include one or multiple PUCCH serving cells. One PUCCH cell group may include only one PUCCH serving cell. One PUCCH cell group may include one PUCCH serving cell, and one or multiple non-PUCCH serving cells.

A PUCCH cell group including the primary cell is referred to as a primary PUCCH cell group or a primary PUCCH group. A PUCCH cell group not including the primary cell is referred to as a secondary PUCCH cell group or a secondary PUCCH group. In other words, the secondary PUCCH cell group includes a PUCCH secondary cell.

An index for identifying the PUCCH cell group (a cell group index) may be defined. The index for the primary PUCCH cell group is always zero. The index for the secondary PUCCH cell group is configured by a network device (the base station device 3).

The PUCCH of the PUCCH serving cell is used in order to transmit uplink control information (the HARQ-ACK and/or the CSI) for the serving cell (the PUCCH serving cell, the non-PUCCH serving cell) included in the PUCCH cell group to which the PUCCH serving cell belongs.

In other words, the uplink control information (HARQ-ACK and/or CSI) for a serving cell (PUCCH serving cell, non-PUCCH serving cell) included in the PUCCH cell group, is transmitted using the PUCCH in the PUCCH serving cell included in the PUCCH cell group.

For example, the uplink control information (HARQ-ACK and/or CSI) for a serving cell included in the primary PUCCH cell group, may be transmitted using the PUCCH in the PUCCH secondary cell included in the primary PUCCH cell group.

The PUCCH cell group for the HARQ-ACK and the PUCCH cell group for the CSI may be individually defined. The PUCCH cell group for the HARQ-ACK and the PUCCH cell group for the CSI may be in common.

The uplink control information (HARQ-ACK and/or CSI) for a serving cell (PUCCH serving cell, non-PUCCH serving cell) included in the PUCCH cell group, may be transmitted using the PUSCH in the serving cell included in the PUCCH cell group.

The CSI for a serving cell (PUCCH serving cell, non-PUCCH serving cell) included in the PUCCH cell group, may be transmitted using the PUSCH in the serving cell included in the PUCCH cell group or the PUSCH in the serving cell included in a different PUCCH cell group from the PUCCH cell group.

The periodic CSI reporting for a serving cell (PUCCH serving cell, non-PUCCH serving cell) included in the PUCCH cell group, may be transmitted using the PUCCH in the PUCCH serving cell included in the PUCCH cell group or the PUSCH in the serving cell included in the PUCCH cell group.

The non-periodic CSI reporting for a serving cell (PUCCH serving cell, non-PUCCH serving cell) included in the PUCCH cell group, may be transmitted using the PUCCH in the PUCCH serving cell included in the PUCCH cell group, the PUSCH in the serving cell included in the PUCCH cell group, or the PUSCH in the serving cell included in a different PUCCH serving cell from the PUCCH cell group.

Figure 2:
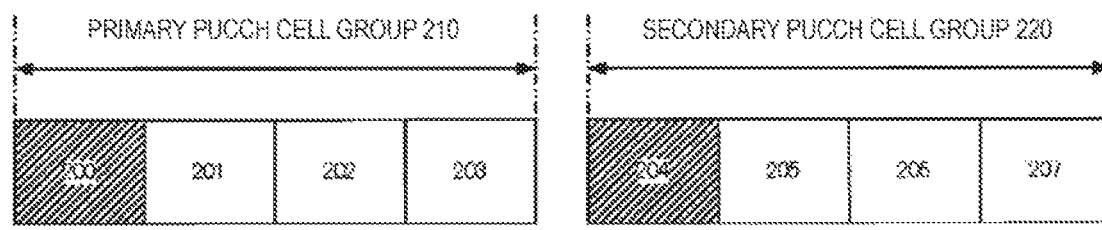
FIG. 2 is a diagram illustrating an example of PUCCH cell groups according to the present embodiment.

FIG. 2 is a diagram illustrating an example of PUCCH cell groups according to the present embodiment.

In FIG. 2, rectangles labeled 200 to 207 illustrate respective serving cells to be aggregated. In FIG. 2, a serving cell 200 is a primary cell, and serving cells 201 to 207 are secondary cells. In FIG. 2, the serving cells 200, 202, and 204 are PUCCH serving cells, and the serving cells 201, 203, 205, 206, and 207 are non-PUCCH serving cells.

In FIG. 2, a primary PUCCH cell group 210 includes the serving cells 200 to 203. Uplink control information on the serving cells 200 to 203 may be transmitted using the PUCCH in the serving cell 200, the PUSCH in the serving cell 200, the PUSCH in the serving cell 201, the PUSCH in the serving cell 202, and/or the PUSCH in the serving cell 201.

In FIG. 2, a secondary PUCCH cell group 220 includes the serving cells 204 to 207, Uplink control information on the serving cells 204 to 207 may be transmitted using the PUCCH in the serving cell 204, the PUSCH in the serving cell 204, the PUSCH in the serving cell 205, the PUSCH in the serving cell 206, and/or the PUSCH in the serving cell 207.

Serving cell activation and deactivation according to the present embodiment will be described below.

The primary cell is always activated. The network (base station device 3) can transmit an activation/deactivation Medium Access Control (MAC) Control Element (CE) to thereby activate/deactivate a configured secondary cell. The terminal device 1 activates the configured secondary cell upon reception of the activation/deactivation MAC CE indicating activation of the configured serving cell. The terminal device 1 deactivates the configured secondary cell upon reception of an activation/deactivation MAC CE indicating deactivation of the configured serving cell.

The terminal device 1 holds sCellDeactivationTimer for each configured secondary cell and, when sCellDeactivationTimer expires, deactivates the related secondary cell. Upon reception of an activation/deactivation MAC CE indicating activation of a configured serving cell in subframe n, the terminal device 1 starts/restarts sCellDeactivationTimer relating to the configured serving cell in subframe n+8. Upon reception of an activation/deactivation MAC CE indicating activation of a configured PDCCH secondary cell in subframe n, the terminal device 1 need not start or restart sCellDeactivationTimer relating to the configured PUCCH secondary cell in subframe n+8.

Activating a secondary cell corresponds to applying normal secondary cell operations (actions) including monitoring the PDCCH in the secondary cell, (2) monitoring the PDCCH for the secondary cell, (3) transmission of SRS in the secondary cell, and (4) CSI reporting for the secondary cell.

In the present embodiment, (1) an action related to monitoring the PDCCH in the secondary cell, (2) an action related to monitoring the PDCCH for the secondary cell, and (3) an action related to transmission of SRS in the secondary cell are also referred to as a first action. In the present embodiment, (4) an action related to CSI reporting for the secondary cell is also referred to as a second action.

The second action includes (4-1) an action related to CSI reporting for the secondary cell in the PDCCH and (4-2) an action related to CSI reporting for the secondary cell in the PUSCH. In the present embodiment, (4-1) the action related to CSI reporting for the secondary cell in the PDCCH is also referred to as a third action. In the present embodiment, (4-2) the action related to CSI reporting for the secondary cell in the PUSCH is also referred to as a fourth action.

When the secondary cell is deactivated, the terminal device 1 (1) does not monitor the PDCCH in the deactivated secondary cell, (2) does not monitor the PDCCH in the deactivated secondary cell, (3) does not transmit any SRS in the deactivated secondary cell, (4) does not report CSI for the deactivated secondary cell, (5) does not transmit any UL-SCH in the deactivated secondary cell, and (6) does not transmit any PRACH in the deactivated secondary cell.

Description will be given below of subframes (timings) in which, upon reception of activation/deactivation MAC CE indicating activation of a secondary cell in subframe n, the first action, the third action, and the fourth action for the secondary cell are applied.

Figure 3:
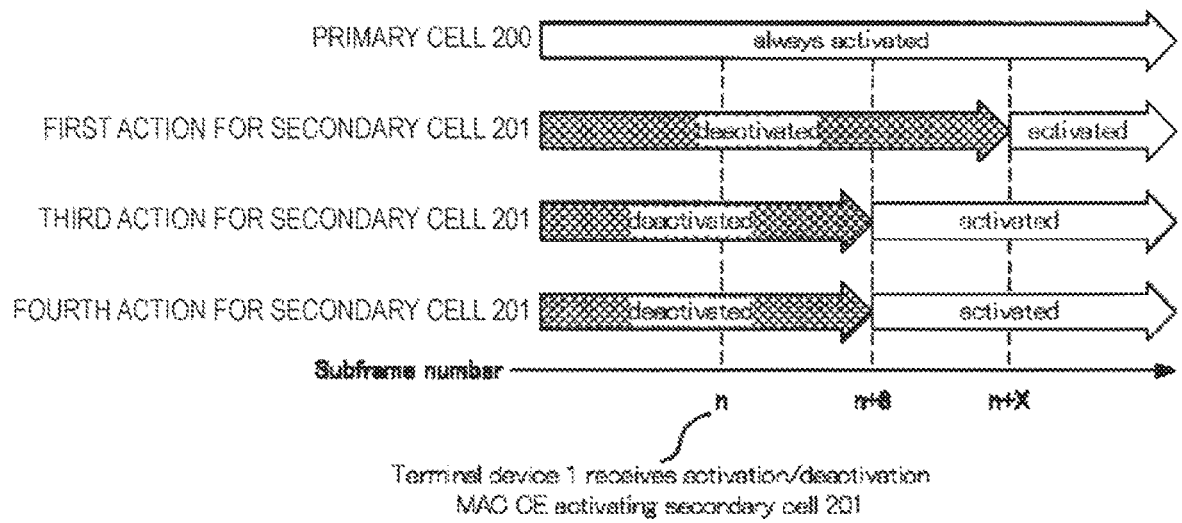
FIG. 3 is a diagram illustrating an example of subframes in which a first action, a third action, and a fourth action for a secondary cell 201 are applied, according to the present embodiment.

FIG. 3 is a diagram illustrating an example of subframes in which the first action, the third action, and the fourth action for the secondary cell 201 are applied, according to the present embodiment. In FIG. 3, the secondary cell 201 belongs to the primary PUCCH cell group 210.

In subframe n in FIG. 3, the secondary cell 201 is deactivated. In other words, in subframe n in FIG. 3, the first action, the third action, and the fourth action for the secondary cell 201 are not applied. In FIG. 3, the terminal device 1 receives activation/deactivation MAC CE indicating activation of the secondary cell 201 in subframe n. In FIG. 3, the terminal device 1 starts application of the first action for the secondary cell 201 in subframe n+X and starts application of the third action and the fourth action for the secondary cell 201 in subframe n+8. Subframe n+X is a subframe that is no earlier than subframe n+8.

Figure 4:
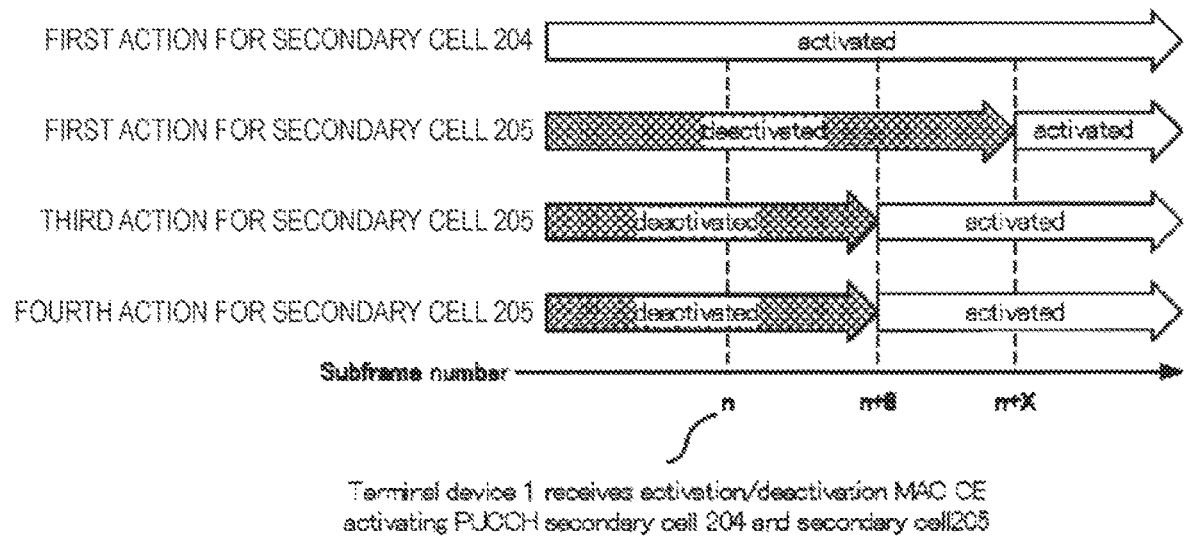
FIG. 4 is a diagram illustrating an example of subframes in which a first action, a third action, and a fourth action for a secondary cell 205 are applied, according to the present embodiment.

FIG. 4 is a diagram illustrating an example of subframes in which the first action, the third action, and the fourth action for the secondary cell 205 are applied, according to the present embodiment. In FIG. 4, the secondary cell 205 belongs to the secondary PUCCH cell group 220. In FIG. 4, the secondary cell 204 is a PUCCH secondary cell belonging to the secondary PUCCH cell group 220.

In FIG. 4, the secondary cell 204 is already activated in subframe n to subframe; n+8. Specifically, in FIG. 4, the first action for the secondary cell 204 is already applied in subframe n to subframe n+8. In subframe n in FIG. 4, the secondary cell 205 is deactivated. Specifically, in subframe n in FIG. 4, the first action, the third action, and the fourth action for the secondary cell 205 are not applied.

In FIG. 4, the terminal device 1 receives activation/deactivation MAC CE indicating activation of the secondary cell 204 and the secondary cell 205 in subframe n. In FIG. 4, the terminal device 1 starts application of the first action for the secondary cell 205 in subframe n+X and starts application of the third action and the fourth action for the secondary cell 205 in subframe n+8. Subframe n+X is a subframe that is no earlier than subframe n+8.

Figure 5:
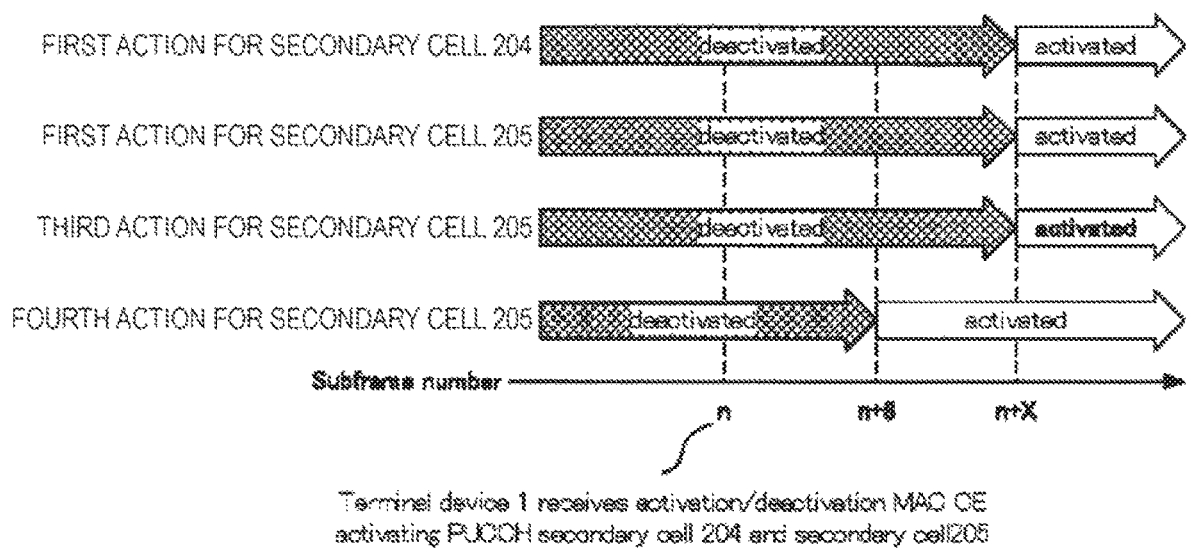
FIG. 5 is a diagram illustrating an example of subframes in which the first action, the third action, and the fourth action for the secondary cell 205 are applied, according to the present embodiment.

FIG. 5 is a diagram illustrating an example of subframes in which the first action, the third action, and the fourth action for the secondary cell 205 are applied, according to the present embodiment. In FIG. 5, the secondary cell 205 belongs to the secondary PUCCH cell group 220. In FIG. 5, the secondary cell 204 is a PUCCH secondary cell belonging to the secondary PUCCH cell group 220.

In subframe n to subframe n+8 in FIG. 5, the secondary cell 04 is deactivated. Specifically, in subframe n to subframe n+8 in FIG. 5, the first action for the secondary cell 204 is not applied. In subframe n in FIG. 5, the secondary cell 205 is deactivated. Specifically, in subframe n to subframe n+8 in FIG. 5, the first action, the third action, and the fourth action for the secondary cell 205 are not applied.

In FIG. 5, the terminal device 1 receives activation/deactivation MAC CE indicating activation of the secondary cell 204 and the secondary cell 205 in subframe n. In FIG. 5, the terminal device 1 starts application of the first action for the secondary cell 204, the first action for the secondary cell 205, and the third action for the secondary cell 205 in subframe n+X and starts application of the fourth action for the secondary cell 205 in subframe n+8. Subframe n+X is a subframe that is no earlier than subframe, n+8.

In FIG. 5, the terminal device 1 starts application of the first action for the secondary cell 205 and the third action for the secondary cell 205 in subframe n+X, in which the secondary cell 204 is activated. In other words, in FIG. 5, the terminal device 1 starts application of the first action for the secondary cell 205 and the third action for the secondary cell 205 in subframe n+X, in which the first action for the secondary cell 204 is applied.

In FIG. 5, the terminal device 1 may start application of the third action for the secondary cell 205 and the fourth action for the secondary cell 205 in different subframes (timings).

In FIG. 4 or FIG. 5, the terminal device 1 may determine a subframe in which application of the third action for the secondary cell 205 is started, on the basis of whether the secondary cell 204 is activated in subframe n+8.

In FIG. 4 or FIG. 5, the terminal device 1 may start application of the fourth action for the secondary cell 205 in subframe n+8 irrespective of whether the secondary cell 204 is activated in subframe n+8. For example, in FIG. 4 or FIG. 5, when the secondary cell 206 is activated in subframe n+8, the terminal device 1 may start application of the fourth action for the secondary cell 205 in subframe n+8 irrespective of whether the secondary cell 204 is activated in subframe n+8. Here, the fourth action may be performed in the secondary cell 206.

When the PUSCH is transmitted in the subframe in which the fourth action for the secondary cell is applied, the terminal device 1 may transmit CSI for the secondary cell through the PUSCH in the subframe.

When the PUSCH is transmitted in a subframe subsequent to the subframe in which application of the fourth action for the secondary cell is started, the terminal device 1 may transmit CSI for the secondary cell through the PUSCH in the subsequent subframe.

The base station device 3 may assume that the terminal device 1 starts application of action 1, action 3, and action 4 in the subframes (timings) described with reference to FIG. 3 to FIG. 5.

A configuration of devices according to the present embodiment will be described below.

Figure 6:
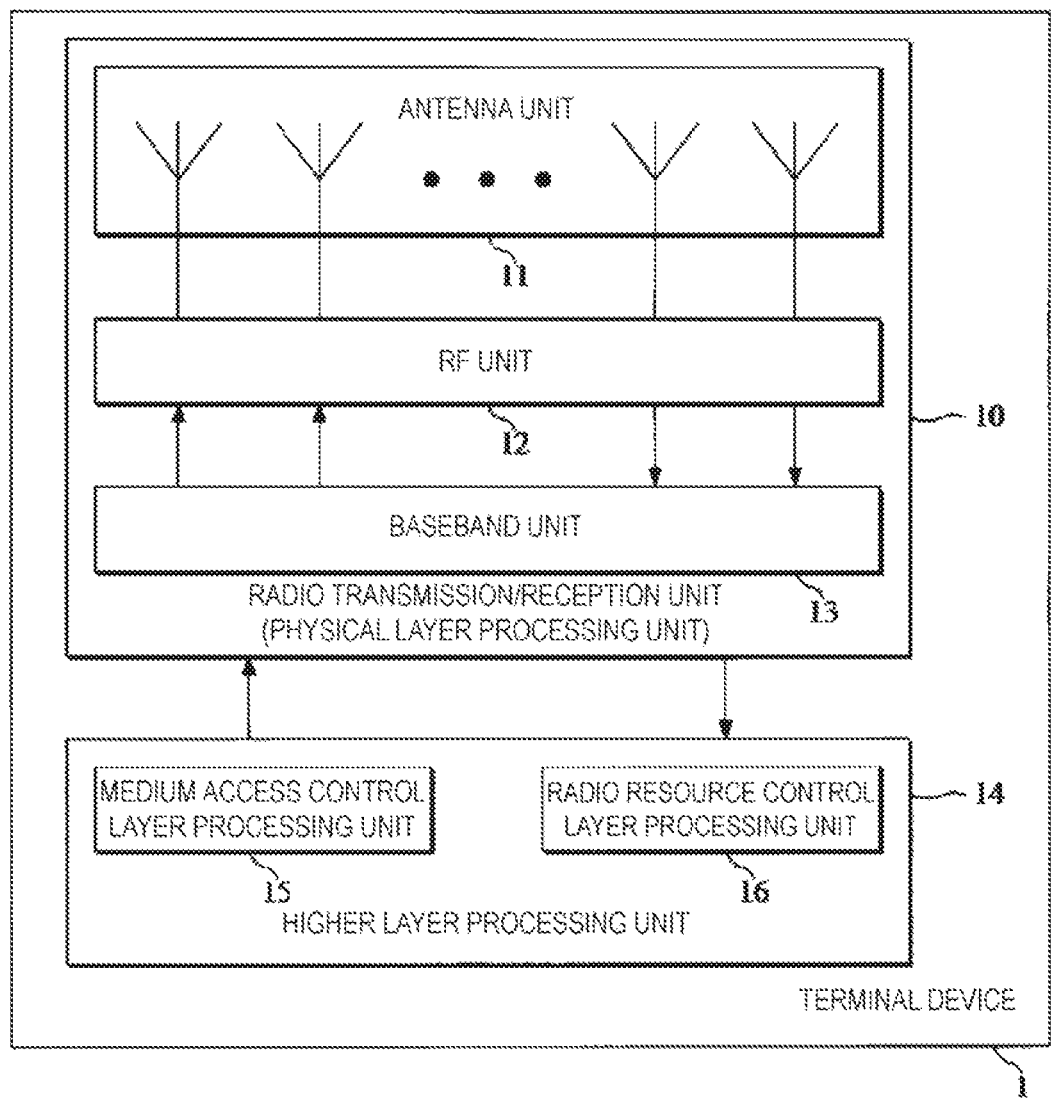
FIG. 6 is a schematic block diagram illustrating a configuration of a terminal device 1 according to the present embodiment.

FIG. 6 is a schematic block diagram illustrating a configuration of the terminal device 1 according to the present embodiment. As illustrated in FIG. 6, the terminal device 1 is configured to include a radio transmission/reception unit 10 and a higher layer processing unit 14. The radio transmission/reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission/reception unit 10 is also referred to as a transmission unit, a reception unit, or a physical layer processing unit.

The higher layer processing unit 14 outputs uplink data (transport block) generated by a user operation or the like, to the radio transmission/reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the medium access control layer. The medium access control layer processing unit 15 controls serving cell activation/deactivation on the basis of various pieces of configuration information/parameters managed by the radio resource control layer processing unit 16.

The radio resource control layer processing unit 16 included in the higher layer processing unit 14 performs processing of the radio resource control layer. The radio resource control layer processing unit 16 manages various pieces of configuration information/parameters of the terminal device 1 itself. The radio resource control layer processing unit 16 sets the various pieces of configuration information/parameters in accordance with higher layer signaling received from the base station device 3. Specifically, the radio resource control layer processing unit 16 sets the various pieces of configuration information/parameters in accordance with the information indicating the various pieces of configuration information/parameters received from the base station device 3.

The radio transmission/reception unit 10 performs processing of the physical layer, such as modulation, demodulation, coding, and decoding. The radio transmission/reception unit 10 demultiplexes, demodulates, and decodes a signal received from the base station device 3, and outputs the information resulting from the decoding to the higher layer processing unit 14. The radio transmission/reception unit 10 modulates and codes data to generate a transmit signal, and transmits the transmit signal to the base station device 3.

The RF unit 12 converts (down-converts) a signal received through the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 performs Inverse Fast Fourier Transform (IEFT) on data, generates an SC-FDMA symbol, attaches a CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the final result via the antenna unit 11. Moreover, the RF unit 12 amplifies power. Furthermore, the RF unit 12 may include a function of controlling transmit power. The RF unit 12 is also referred to as a transmit power control unit.

Figure 7:
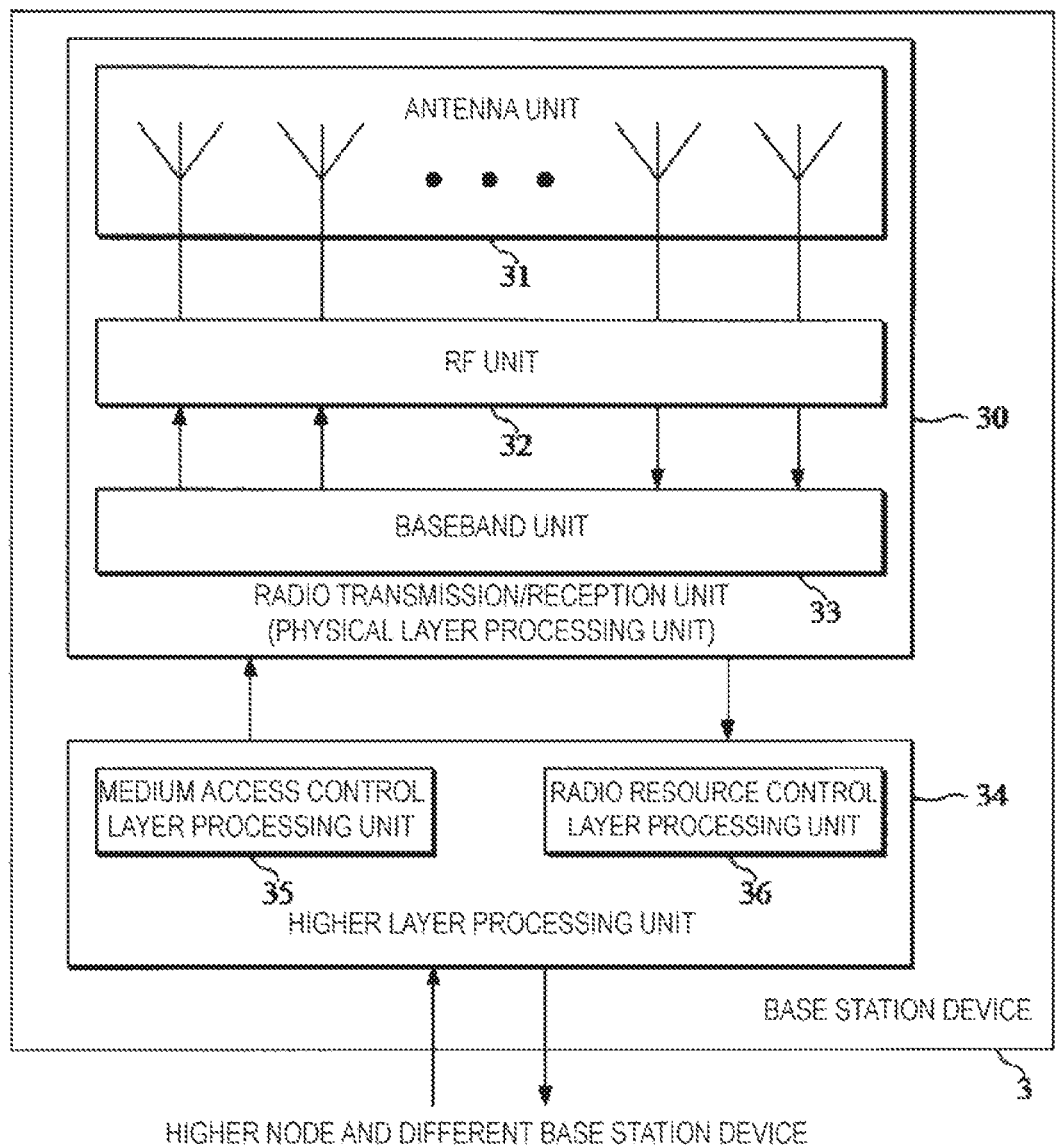
FIG. 7 is a schematic block diagram illustrating a configuration of a base station device 3 according to the present embodiment.

FIG. 7 is a schematic block diagram illustrating a configuration of the base station device 3 according to the present embodiment. As illustrated in FIG. 7, the base station device 3 is configured to include a radio transmission/reception unit 30 and a higher layer processing unit 34. The radio transmission/reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission/reception unit 30 is also referred to as a transmission unit, a reception unit, or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the medium access control layer. The medium access control layer processing unit 35 controls serving cell activation/deactivation on the basis of various pieces of configuration information/parameters managed by the radio resource control layer processing unit 36.

The radio resource control layer processing unit 36 included in the higher layer processing unit 34 performs processing of the radio resource control layer. The radio resource control layer processing unit 36 generates, or acquires from a higher node, downlink data (transport block) arranged on a physical downlink shared channel, system information, an RRC message, a MAC Control Element (CE), and the like, and outputs the generated or acquired data to the radio transmission/reception unit 30. Furthermore, the radio resource control layer processing unit 36 manages various pieces of configuration information/parameters for each of the terminal devices 1. The radio resource control layer processing unit 36 may set various pieces of configuration information/parameters for each of the terminal devices 1 via the higher layer signaling. In other words, the radio resource control layer processing unit 36 transmits/broadcasts information indicating various pieces of configuration information/parameters.

The functionality of the radio transmission/reception unit 30 is similar to that of the radio transmission/reception unit 10, and hence description thereof is omitted.

(1) A terminal device according to the present embodiment includes: a measurement unit (radio transmission/reception unit 10) configured to derive channel state information for a serving cell; a transmission unit (radio transmission/reception unit 10) configured to transmit an HARQ-ACK relating to a first secondary cell, a second secondary cell, and a third secondary cell on a physical uplink control channel in the first secondary cell, transmit channel state information reporting for the second secondary cell, on the physical uplink control channel in the first secondary cell, and transmit the channel state information reporting for the second secondary cell, on a physical uplink shared channel in the first secondary cell, the second secondary cell, or the third secondary cell; and a MAC layer processing unit 15 configured to, when a MAC control element indicating activation of the first secondary cell, the second secondary cell, and/or the third secondary cell is received, activate the first secondary cell, the second secondary cell, and/or the third secondary cell. Activating the first secondary cell, the second secondary cell, or the third secondary cell includes applying multiple actions including an action related to channel state information reporting for the first secondary cell, the second secondary cell, or the third secondary cell and an action related to monitoring the physical downlink control channel for the first secondary cell, the second secondary cell, or the third secondary cell. When the MAC control element indicating activation of the second secondary cell is received in subframe n and the action of monitoring the physical downlink control channel for the first secondary cell is applied in subframe n+8, the action related to the channel state information reporting for the second secondary cell on the physical uplink control channel is applied in the subframe n+8. When the MAC control element indicating activation of the second secondary cell is received in the subframe n and the action of monitoring the physical downlink control channel for the first secondary cell is not applied in the subframe n+8, the action related to the channel state information reporting for the second secondary cell on the physical uplink control channel is applied in a subframe that is no earlier than the subframe n+8 and in which the action of monitoring the physical downlink control channel for the first secondary cell is applied. When the MAC control element indicating activation of the second secondary cell is received in the subframe n, the action related to the channel state information reporting for the second secondary cell on the physical uplink shared channel is applied in the subframe n+8, irrespective of whether the action of monitoring the physical downlink control channel for the first secondary cell is applied in the subframe n+8.

(2) In the terminal device according to the present embodiment, the transmission unit transmits an HARQ-ACK relating to a primary cell and a fourth secondary cell on a physical uplink control channel in the primary cell, transmits channel state information reporting for the fourth secondary cell on the physical uplink control channel in the primary cell, and transmits the channel state information reporting for the fourth secondary cell on a physical uplink shared channel in the primary cell or the fourth secondary cell, when a MAC control element indicating activation of the fourth secondary cell is received, the MAC layer processing unit activates the fourth secondary cell. Activating the fourth secondary cell includes applying multiple actions including an action related to channel state information reporting for the fourth secondary cell and an action related to monitoring a physical downlink control channel for the fourth secondary cell. When the MAC control element indicating activation of the fourth secondary cell is received in the subframe n, the action related to the channel state information reporting for the fourth secondary cell on the physical uplink control channel and the action related to the channel state information reporting for the fourth secondary cell on the physical uplink shared channel are applied in the subframe n+8.

(3) In the terminal device according to the present embodiment, when the MAC control element indicating activation of the first secondary cell is received in the subframe n, an sCellDeactivationTimer relating to the first secondary cell is not started in the subframe n+8, while, when the MAC control element indicating activation of the second secondary cell is received in the subframe n, an sCellDeactivationTimer relating to the second secondary cell is started in the subframe n+8.

(4) A terminal device according to the present embodiment includes: a measurement unit (radio transmission/reception unit 10) configured to derive channel stat information for a serving cell; a transmission unit configured to transmit an HARQ-ACK relating to a first secondary cell, a second secondary cell, and a third secondary cell on a physical uplink control channel in the first secondary cell, transmit channel state information reporting for the second secondary cell, on the physical uplink control channel in the first secondary cell, and transmit the channel state information reporting for the second secondary cell, on a physical uplink shared channel in the first secondary cell, the second secondary cell, or the third secondary cell; and a MAC layer processing unit configured to, when a MAC control element indicating activation of the first secondary cell, the second secondary cell, and/or the third secondary cell is received, activate the first secondary cell, the second secondary cell, and/or the third secondary cell. Activating the first secondary cell, the second secondary cell, or the third secondary cell includes applying multiple actions including an action related to channel state information reporting for the first secondary cell, the second secondary cell, or the third secondary cell and an action related to monitoring the physical downlink control channel for the first secondary cell, the second secondary cell, or the third secondary cell. When the MAC control element indicating activation of the second secondary cell is received in subframe n and the action of monitoring the physical downlink control channel for the first secondary cell is applied in subframe n+8, the action related to the channel state information reporting for the second secondary cell in the first secondary cell is applied in the subframe n+8. When the MAC control element indicating activation of the second secondary cell is received in the subframe n and the action of monitoring the physical downlink control channel for the first secondary cell is not applied in the subframe n+8, the action related to the channel state information reporting for the second secondary cell in the first secondary cell is applied in a subframe that is no earlier than the subframe n+8 and in which the action of monitoring the physical downlink control channel for the first secondary cell is applied. When the MAC control element indicating activation of the second secondary cell is received in the subframe n, the action related to the channel state information reporting for the second secondary cell in the third secondary cell is applied in the subframe n+8, irrespective of whether the action of monitoring the physical downlink control channel for the first secondary cell is applied in the subframe n+8.

With this configuration, the terminal device 1 can communicate with the base station device 3 efficiently.

A program running on each of the base station device 3 and the terminal device 1 according to the present invention may be a program that controls a Central Processing Unit (CPU) and the like (a program for causing a computer to operate) in such a manner as to realize the functions according to the above-described embodiment of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD) and when necessary, is read by the CPU to be modified or rewritten.

Moreover, the terminal device 1 and the base station device 3 according to the above-described embodiment may be partially realized by a computer. This configuration may be realized by recording a program for realizing such control functions on a computer-readable medium and causing a computer system to read the program recorded on the recording medium for execution.

Note that the "computer system" here refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the above-described program may be configured to realize some of the functions described above, and also may be configured to be capable of realizing the functions described above in combination with a program already recorded in the computer system.

Furthermore, the base station device 3 according to the above-described embodiment can be realized as an aggregation (a device group) constituted of multiple devices. Devices constituting the device group may be each equipped with some or all portions of each function or each functional block of the base station device 3 according to the above-described embodiment. It is only required that the device group itself include general functions or general functional blocks of the base station device 3. Furthermore, the terminal device 1 according to the above-described embodiment can also communicate with the base station device as the aggregation.

Furthermore, the base station device 3 according to the above-described embodiment may be an Evolved Universal Terrestrial Radio Access Network (EUTRAN). Furthermore, the base station device 3 according to the above-described embodiment may have some or all portions of the function of a node higher than an eNodeB.

Furthermore, some or all portions of each of the terminal device 1 and the base station device 3 according to the above-described embodiment may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, the circuit integration technique is not limited to the LSI, and the integrated circuit may be realized in the form of a dedicated circuit or a general-purpose processor. Furthermore, if with advances in semiconductor technology, a circuit integration technology with which an LSI is replaced appears, it is also possible to use an integrated circuit based on the technology.

Furthermore, in the above-described embodiment, the terminal device is described as one example of a communication device, but the present invention is not limited to this, and can be applied to a fixed-type or a stationary-type electronic apparatus installed indoors or outdoors, for example, a terminal device or a communication device, such as an audio-video (AV) apparatus, a kitchen apparatus, a cleaning or washing machine, an air-conditioning apparatus, office equipment, a vending machine, and other household apparatuses.

The embodiment of the present invention have been described in detail above referring to the drawings, but the specific configuration is not limited to the embodiment and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element described in any of the embodiments is substituted for the one described in any of the embodiments and achieving the same effect as the constituent element, is also included in the technical scope of the present invention.

DESCRIPTION OF REFERENCE NUMERALS

1 (1A, 1B, 1C) Terminal device
3 Base station device
10 Radio transmission/reception unit
11 Antenna unit
12 RF unit
13 Baseband unit
14 Higher layer processing unit
15 Medium access control layer processing unit
16 Radio resource control layer processing unit
30 Radio transmission/reception unit
31 Antenna unit
32 RF unit
33 Baseband unit
34 Higher layer processing unit
35 Medium access control layer processing unit
36 Radio resource control layer processing unit

The invention claimed is:

1. A terminal device comprising:
transmission circuitry that:
transmit a periodic channel state information reporting for a second secondary cell, using a physical uplink control channel in a first secondary cell,
transmit the periodic channel state information reporting for the second secondary cell, using a physical uplink shared channel in a third secondary cell; and
MAC layer processing circuitry that, in a case that a MAC control element indicating activation of the second secondary cell is received in a subframe n, activate the second secondary cell, wherein
activating the second secondary cell corresponds to applying a secondary cell operation including a first action related to the periodic channel state information reporting for the second secondary cell using the physical uplink control channel in the first secondary cell and a second action related to the periodic channel state information reporting for the second secondary cell using the physical uplink shared channel in the third secondary cell, based on the MAC control element indicating activation of the second secondary cell is received in the subframe n and the first secondary cell is not activating in the subframe n+8, the first action being applied in the earliest subframe in which the first secondary cell is activated, the earliest subframe being after the subframe n+8, and based on the MAC control element indicating activation of the second secondary cell is received in the subframe n and the third secondary cell is activated in the subframe n+8, the second action being applied in the subframe n+8.

2. A base station device comprising:
receiving circuitry that:
receive a periodic channel state information reporting for a second secondary cell, using a physical uplink control channel in a first secondary cell;
receive the periodic channel state information reporting for the second secondary cell, using a physical uplink shared channel in a third secondary cell; and
transmission circuitry that transmit a MAC control element indicating activation of the second secondary cell in a subframe n, wherein
activating the second secondary cell corresponds to applying a secondary cell operation including a first action related to the periodic channel state information reporting for the second secondary cell using the physical uplink control channel in the first secondary cell and a second action related to the periodic channel state information reporting for the second secondary cell using the physical uplink shared channel in the third secondary cell, based on the MAC control element indicating activation of the second secondary cell is received in the subframe n and the first secondary cell is not activating in the subframe n+8, the first action being applied in the earliest subframe in which the first secondary cell is activated, the earliest subframe being after the subframe n+8, and based on the MAC control element indicating activation of the second secondary cell is received in the subframe n and the third secondary cell is activated in the subframe n+8, the second action being applied in the subframe n+8.

3. A communication method used by a terminal device, the communication method comprising:
transmitting a periodic channel state information reporting for a second secondary cell, using a physical uplink control channel in a first secondary cell,
transmitting the periodic channel state information reporting for the second secondary cell, using a physical uplink shared channel in a third secondary cell; and based on a MAC control element indicating activation of the second secondary cell is received in a subframe n, activating the second secondary cell, wherein
activating the second secondary cell corresponds to applying a secondary cell operation including a first action related to the periodic channel state information reporting for the second secondary cell using the physical uplink control channel in the first secondary cell and a second action related to the periodic channel state information reporting for the second secondary cell using the physical uplink shared channel in the third secondary cell, based on the MAC control element indicating activation of the second secondary cell is received in the subframe n and the first secondary cell is not activating in the subframe n+8, the first action being applied in the earliest subframe in which the first secondary cell is activated, the earliest subframe being after the subframe n+8, and based on the MAC control element indicating activation of the second secondary cell is received in the subframe n and the third secondary cell is activated in the subframe n+8, the second action being applied in the subframe n+8.

4. A communication method used by a base station device, the communication method comprising:
receiving a periodic channel state information reporting for a second secondary cell, using a physical uplink control channel in a first secondary cell,
receiving the periodic channel state information reporting for the second secondary cell, using a physical uplink shared channel in a third secondary cell; and
transmitting a MAC control element indicating activation of the second secondary cell in a subframe n, wherein
activating the second secondary cell corresponds to applying a secondary cell operation including a first action related to the periodic channel state information reporting for the second secondary cell using the physical uplink control channel in the first secondary cell and a second action related to the periodic channel state information reporting for the second secondary cell using the physical uplink shared channel in the third secondary cell, based on the MAC control element indicating activation of the second secondary cell is received in the subframe n and the first secondary cell is not activating in the subframe n+8, the first action being applied in the earliest subframe in which the first secondary cell is activated, the earliest subframe being after the subframe n+8, and based on the MAC control element indicating activation of the second secondary cell is received in the subframe n and the third secondary cell is activated in the subframe n+8, the second action being applied in the subframe n+8.

* * * * *